(12) United States Patent
Zhang et al.

(10) Patent No.: US 9,942,006 B2
(45) Date of Patent: Apr. 10, 2018

(54) METHOD AND DEVICE FOR DETERMINING INTERLEAVER

(71) Applicant: HUAWEI TECHNOLOGIES CO., LTD., Shenzhen (CN)

(72) Inventors: Wen Zhang, Shenzhen (CN); Yongxia Lyu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 14/848,551

(22) Filed: Sep. 9, 2015

(65) Prior Publication Data

US 2015/0381318 A1 Dec. 31, 2015

Related U.S. Application Data (63) Continuation of application No. PCT/CN2013/072393, filed on Mar. 11, 2013.

(51) Int. Cl.
*H04L 1/00* (2006.01)
*H04W 74/00* (2009.01)

(52) U.S. Cl.
CPC ......... *H04L 1/0071* (2013.01); *H04W 74/004* (2013.01); *H04L 1/005* (2013.01)

(58) Field of Classification Search
CPC ....... H04L 27/26; H04L 1/0071; H04L 1/005; H04W 74/004
See application file for complete search history.

(56) References Cited

U.S. PATENT DOCUMENTS

| 2006/0109158 A1 | 5/2006 | Ettorre |
| 2009/0132872 A1 | 5/2009 | Leung et al. |
| 2012/0327875 A1* | 12/2012 | Han ............... H04L 27/2602 370/329 |

(Continued)

FOREIGN PATENT DOCUMENTS

| CN | 1714513 | 12/2005 |
| CN | 101438501 | 5/2009 |
| EP | 1432261 | 6/2004 |

(Continued)

OTHER PUBLICATIONS

International Search Report dated Dec. 19, 2013, in corresponding International Application No. PCT/CN2013/072393.

(Continued)

*Primary Examiner* — Jae Y Lee
(74) *Attorney, Agent, or Firm* — Staas & Halsey LLP (57) ABSTRACT

The present invention discloses a method for determining an interleaver, including: determining an interleaver identifier according to a binding parameter and a preset association relationship between the interleaver identifier and the binding parameter; performing interleaving processing on to-be-sent data by using an interleaver corresponding to the interleaver identifier; and performing de-interleaving processing on received data by using the interleaver corresponding to the interleaver identifier. An embodiment of the present invention further provides a corresponding device. According to technical solutions of the present invention, during data transmission, a UE and an eNodeB can accurately learn an interleaver that is used by the other party, thereby de-interleaving data correctly.

6 Claims, 4 Drawing Sheets

(56) References Cited

U.S. PATENT DOCUMENTS

2013/0022012 A1* 1/2013 Lee .................. H04W 52/0216
370/329
2014/0153484 A1* 6/2014 Kim ....................... H04L 1/004
370/328

FOREIGN PATENT DOCUMENTS

| EP | 2717478 | 4/2014 |
|----|---------|--------|
| JP | 2013-123158 | 6/2013 |
| WO | 2012/165424 A1 | 12/2012 |

OTHER PUBLICATIONS

Extended European Search Report dated Feb. 4, 2016 in corresponding European Patent Application No. 13878366.7.
PCT International Search Report dated Dec. 19, 2013 in corresponding International Patent Application No. PCT/CN2013/072393.

* cited by examiner

METHOD AND DEVICE FOR DETERMINING INTERLEAVER

CROSS-REFERENCE

This application is a continuation of International Application No. PCT/CN2013/072393, filed on Mar. 11, 2013, which is hereby incorporated by reference in its entirety.

TECHNICAL FIELD

The present invention relates to the field of communications technologies, and in particular, to a method and device for determining an interleaver.

BACKGROUND

Based on code division multiple access (CDMA), an interleave division multiple access (IDMA) multiplexing access solution is proposed. A feature of an IDMA technology is that users and channels are distinguished by using chip-level interleavers that are uniquely identified by the users. Compared with a conventional CDMA multiple access system, an IDMA system has better multi-access interference immunity performance by using an iterative multi-user detection manner. Herein, an interleaver replaces spreading code in the CDMA, and becomes a unique means to distinguish users. At a transmit end, after being processed by using their own unique interleavers, multiple user signals access a channel in a multiplexing manner. At a decoding end, decoding is performed by using an iterative multi-user detection algorithm that is used in IDMA multi-user detection. The IDMA may be combined with orthogonal frequency division multiplexing (OFDM)/orthogonal frequency division multiple access (OFDMA)/single carrier frequency division multiple access (SC-FDMA), to form a new multiple access manner, thereby obtaining a performance gain.

The inventor of the present invention finds that, when an IDMA multiplexing access technology is introduced to a long term evolution (LTE) system, and when a user equipment (UE) and an evolved NodeB (eNodeB) transmit data by using an IDMA multiplexing access system, there is no relatively desirable method for them to learn which interleaver is used by the other party during data transmission.

SUMMARY

Embodiments of the present invention provide a method for determining an interleaver, so that during data transmission, a UE and an eNodeB can accurately learn an interleaver that is used by the other party, thereby de-interleaving data correctly. The embodiments of the present invention further provide a corresponding device.

According to a first aspect, the present invention provides a method for determining an interleaver, including:

determining an interleaver identifier according to a binding parameter and a preset association relationship between the interleaver identifier and the binding parameter;

performing interleaving processing on to-be-sent data by using an interleaver corresponding to the interleaver identifier; and performing de-interleaving processing on received data by using the interleaver corresponding to the interleaver identifier.

With reference to the first aspect, in a first possible implementation manner, the binding parameter includes an identifier of a user equipment UE, and the determining an interleaver identifier according to a binding parameter and a preset association relationship between the interleaver identifier and the binding parameter includes:

determining the interleaver identifier according to the identifier of the UE and a preset association relationship between the interleaver identifier and the identifier of the UE.

With reference to the first aspect, in a second possible implementation manner, the binding parameter includes an identifier of a user equipment UE and time information for transmitting data, and the determining an interleaver identifier according to a binding parameter and a preset association relationship between the interleaver identifier and the binding parameter includes:

determining the interleaver identifier according to the identifier of the UE, the time information for transmitting data, and a preset association relationship between the interleaver identifier and the identifier of the UE and the time information for transmitting data.

With reference to the first or second possible implementation manner of the first aspect, in a third possible implementation manner, the identifier of the UE is a C-RNTI of the UE.

With reference to the first possible implementation manner of the first aspect, in a fourth possible implementation manner, the binding parameter further includes a total quantity of interleavers in an available interleaver set of the UE, and the determining the interleaver identifier according to the identifier of the UE and a preset association relationship between the interleaver identifier and the identifier of the UE includes:

determining the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

With reference to the second possible implementation manner of the first aspect, in a fifth possible implementation manner, the binding parameter further includes a total quantity of interleavers in an available interleaver set of the UE, and the determining the interleaver identifier according to the identifier of the UE, the time information for transmitting data, and a preset association relationship between the interleaver identifier and the identifier of the UE and the time information for transmitting data includes:

determining the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

According to a second aspect, the present invention provides a device for determining an interleaver, including:

a determining unit, configured to determine an interleaver identifier according to a binding parameter and a preset association relationship between the interleaver identifier and the binding parameter;

a first processing unit, configured to perform interleaving processing on to-be-sent data by using an interleaver corresponding to the interleaver identifier that is determined by the determining unit; and a second processing unit, configured to perform de-interleaving processing on received data by using the interleaver corresponding to the interleaver identifier that is determined by the determining unit.

With reference to the second aspect, in a first possible implementation manner, the binding parameter includes an identifier of a user equipment UE; and the determining unit is configured to determine the interleaver identifier according to the identifier of the UE and a preset association relationship between the interleaver identifier and the identifier of the UE.

With reference to the second aspect, in a second possible implementation manner, the binding parameter includes an identifier of a user equipment UE and time information for transmitting data; and the determining unit is configured to determine the interleaver identifier according to the identifier of the UE, the time information for transmitting data, and a preset association relationship between the interleaver identifier and the identifier of the UE and the time information for transmitting data.

With reference to the first possible implementation manner of the second aspect, in a third possible implementation manner, the binding parameter further includes a total quantity of interleavers in an available interleaver set of the UE; and the determining unit is configured to determine the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

With reference to the second possible implementation manner of the second aspect, in a fourth possible implementation manner, the binding parameter further includes a total quantity of interleavers in an available interleaver set of the UE; and the determining unit is configured to determine the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

According to a third aspect, the present invention provides a computer storage medium, where the computer storage medium stores a program, where when the program is executed, some or all of the steps in the foregoing method for determining an interleaver are executed.

According to a fourth aspect, the present invention provides a device for determining an interleaver, including: a receiver, a transmitter, a memory, and a processor, where the processor executes the following steps:

determining an interleaver identifier according to a binding parameter and a preset association relationship between the interleaver identifier and the binding parameter;

performing interleaving processing on to-be-sent data by using an interleaver corresponding to the interleaver identifier; and performing de-interleaving processing on received data by using the interleaver corresponding to the interleaver identifier.

With reference to the fourth aspect, in a first possible implementation manner, the binding parameter includes an identifier of a user equipment UE; and the processor is configured to determine the interleaver identifier according to the identifier of the UE and a preset association relationship between the interleaver identifier and the identifier of the UE.

With reference to the fourth aspect, in a second possible implementation manner, the binding parameter includes an identifier of a user equipment UE and time information for transmitting data; and the processor is configured to determine the interleaver identifier according to the identifier of the UE, the time information for transmitting data, and an association relationship between the interleaver identifier and the identifier of the UE and the time information for transmitting data.

With reference to the first possible implementation manner of the fourth aspect, in a third possible implementation manner, the binding parameter further includes a total quantity of interleavers in an available interleaver set of the UE; and the processor is configured to determine the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

With reference to the second possible implementation manner of the fourth aspect, in a fourth possible implementation manner, the binding parameter further includes a total quantity of interleavers in an available interleaver set of the UE; and the processor is configured to determine the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

According to the embodiments of the present invention, an interleaver identifier is determined according to a binding parameter and a preset association relationship between the interleaver identifier and the binding parameter; interleaving processing is performed on to-be-sent data by using an interleaver corresponding to the interleaver identifier; and de-interleaving processing is performed on received data by using the interleaver corresponding to the interleaver identifier. According to the method for determining an interleaver provided in the embodiments of the present invention, a UE and an eNodeB can accurately learn an interleaver that is used during data transmission by the other party, thereby de-interleaving data correctly.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Embodiments of the present invention provide a method for determining an interleaver, so that during data transmission, a UE and an eNodeB can accurately learn an interleaver that is used by the other party, thereby de-interleaving data correctly. The embodiments of the present invention further provide a corresponding device. Detailed descriptions are made in the following separately.

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the embodiments of the present invention, a device for determining an interleaver may be a user equipment (User Equipment, UE), or may be an evolved NodeB (evolved NodeB, eNodeB), where the UE and the eNodeB use a same solution for determining an interleaver.

Figure 1:
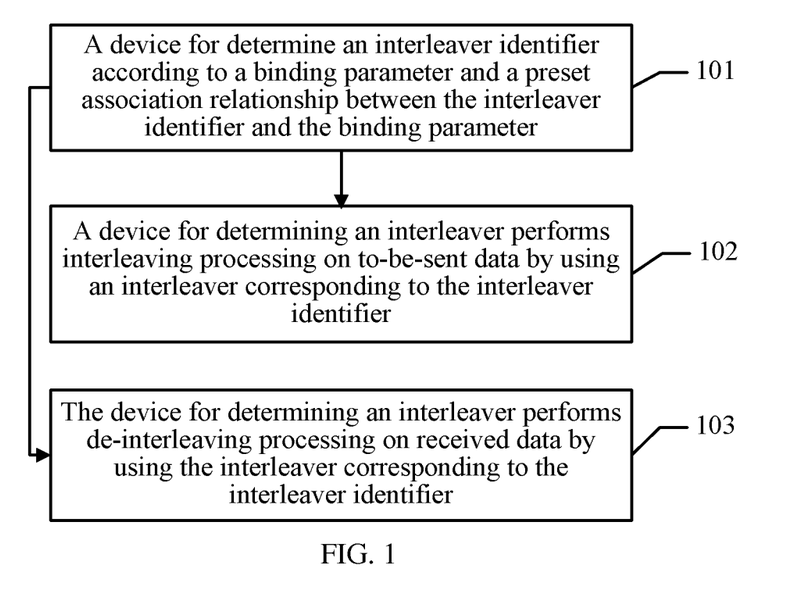
FIG. 1 is a schematic diagram of an embodiment of a method for determining an interleaver according to the embodiments of the present invention.

Referring to FIG. 1, an embodiment of a method for determining an interleaver according to the embodiments of the present invention includes:

101: A device for determining an interleaver determines an interleaver identifier according to a binding parameter and a preset association relationship between the interleaver identifier and the binding parameter.

In this embodiment of the present invention, two ends, that is, a UE and an eNodeB, agree, in advance, a binding parameter associated with an interleaver identifier, and in this way, the UE and the eNodeB can separately obtain the interleaver identifier according to the binding parameter, thereby implementing normal uplink/downlink data transmission.

In this embodiment of the present invention, if not all UEs support an IDMA function, an eNB that supports IDMA broadcasts, to the UEs, information indicating that the eNB has the IDMA function. A UE that supports the IDMA sends, to the eNB that supports the IDMA, information indicating that the UE is a UE that supports the IDMA. To be compatible with a UE that supports only SC-FDMA/OFDMA but does not support the IDMA, the eNB may schedule these two types of UEs in a time division or frequency division manner.

102: The device for determining an interleaver performs interleaving processing on to-be-sent data by using an interleaver corresponding to the interleaver identifier.

In this embodiment of the present invention, the device for determining an interleaver may be used as a sending party, or may be used as a receiving party. When the device for determining an interleaver is used as a sending party, after determining the interleaver identifier, the device for determining an interleaver determines a corresponding interleaver according to the interleaver identifier, performs interleaving processing on to-be-sent data by using the interleaver, and sends the to-be-sent data on which the interleaving processing has been performed.

When the UE is to send uplink data, the UE may perform interleaving processing on the to-be-sent uplink data by using the interleaver; and on the other hand, when the eNodeB is to send downlink data, the eNodeB may also perform interleaving processing on the to-be-sent downlink data by using the interleaver, and sends the to-be-sent downlink data on which the interleaving processing has been performed.

It should be noted that, when the eNodeB performs downlink transmission, because the UE needs to learn, when performing iterative detection, information about another UE that shares a time-frequency resource with the UE, for example, information such as an interleaver, a modulation and coding scheme of the another UE that shares the time-frequency resource with the UE, to enable the UE to complete the iterative detection, the eNB further needs to provide the UE with other information, which is not content to be protected by the present invention and is not limited herein.

103: The device for determining an interleaver performs de-interleaving processing on received data by using the interleaver corresponding to interleaver identifier.

In this embodiment of the present invention, when the device for determining an interleaver is used as a receiving party, the device for determining an interleaver also determines the interleaver identifier in the manner in step 101, and then performs de-interleaving processing on received data by using the interleaver corresponding to the interleaver identifier.

For example, the UE performs de-interleaving processing on received downlink data, and the eNodeB performs de-interleaving processing on received uplink data.

According to this embodiment of the present invention, an interleaver identifier is determined according to a binding parameter and a preset association relationship between the interleaver identifier and the binding parameter; interleaving processing is performed on to-be-sent data by using an interleaver corresponding to the interleaver identifier; and de-interleaving processing is performed on received data by using the interleaver corresponding to the interleaver identifier. According to the method for determining an interleaver provided in this embodiment of the present invention, a UE and an eNodeB can accurately learn an interleaver that is used during data transmission by the other party, thereby de-interleaving data correctly.

Optionally, based on the embodiment corresponding to FIG. 1, in a first optional embodiment of the method for determining an interleaver provided in this embodiment of the present invention, the binding parameter includes an identifier of a user equipment UE, and the determining an interleaver identifier according to a binding parameter and a preset association relationship between the interleaver identifier and the binding parameter includes:

determining the interleaver identifier according to the identifier of the UE and a preset association relationship between the interleaver identifier and the identifier of the UE.

In this embodiment of the present invention, the identifier of the UE may be a cell radio network temporary identifier (Cell Radio Network Temporary Identifier, C-RNTI), and the association relationship between the interleaver identifier and the identifier of the UE may be expressed by using the following formula:

$$i = f(n_{RNTI}), \text{ where}$$

i represents the interleaver identifier, and $n_{RNTI}$ represents the cell radio network temporary identifier.

On the condition that $n_{RNTI}$ is known, i may be obtained according to the association relationship between i and $n_{RNTI}$, thereby determining the interleaver.

For example: $i = n_{RNTI} \bmod M$, where "mod" represents a modulo operation, and M represents a constant and may be given in advance. It is assumed that when $n_{RNTI} = 3324$, and M=100, i=24, thereby determining that a number of the interleaver is 24.

For another example: $i = ((A \cdot n_{RNTI}) \bmod D) \bmod M$, where

M represents a preset constant, and A and D represents two different large prime numbers, for example, A=39827 and D=65537.

Optionally, based on the first optional embodiment corresponding to FIG. 1, in a second optional embodiment of the method for determining an interleaver provided in this embodiment of the present invention, the binding parameter includes an identifier of a user equipment UE and time information for transmitting data, and the determining an interleaver identifier according to a binding parameter and a preset association relationship between the interleaver identifier and the binding parameter includes:

determining the interleaver identifier according to the identifier of the UE and an association relationship between the interleaver identifier and the identifier of the UE and the time information for transmitting data.

In this embodiment of the present invention, the identifier of the UE may be a cell radio network temporary identifier C-RNTI, and the time information for transmitting data may be a subframe number or a radio frame number. By using that the time information is a subframe number as an example, the association relationship between the interleaver identifier and the identifier of the UE and the time information for transmitting data may be expressed as follows:

$$i = g(n_{RNTI}, n_{subframe}), \text{ where}$$

i represents the interleaver identifier, $n_{RNTI}$ represents a cell radio network temporary identifier, and $n_{subframe}$ represents a subframe number for transmitting data; and in this way, on the condition that $n_{RNTI}$ and $n_{subframe}$ are known, i can be determined, thereby determining the interleaver.

For example: $i = (n_{RNTI} + n_{subframe}) \bmod M$, where

M represents a preset constant, and assuming that M=100, $n_{RNTI} = 3324$, and $n_{subframe} = 12$, accordingly, a number of the interleaver that should be used by the UE or the eNodeB is (3324+12) mod 100=36; and in this way, the number of the determined interleaver is 36.

Optionally, based on the first optional embodiment corresponding to FIG. 1, in a third optional embodiment of the method for determining an interleaver provided in this embodiment of the present invention, the binding parameter further includes a total quantity of interleavers in an available interleaver set of the UE, and the determining the interleaver identifier according to the identifier of the UE and a preset association relationship between the interleaver identifier and the identifier of the UE includes:

determining the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

In this embodiment of the present invention, the preset association relationship between the interleaver identifier and the identifier of the UE and the total quantity of interleavers in the available interleaver set of the UE may be expressed as follows:

$$i = n_{RNTI} \bmod I, \text{ where}$$

i represents the interleaver identifier, $n_{RNTI}$ represents the cell radio network temporary identifier, and I represents the total quantity of interleavers in the available interleaver set of the UE.

In this embodiment of the present invention, the total quantity of interleavers may be a quantity of all interleavers in an IDMA system, may be a quantity of interleavers in an interleaver set corresponding to the identifier of the UE after all interleavers are grouped into several sets, or may be a preset total quantity or a total quantity that is related to a cell ID and/or a resource allocated by a UE.

For example, when the cell ID is 1, a total quantity of corresponding interleavers is 10, when the cell ID is 1, a total quantity of corresponding interleavers is 8, or the like.

"mod" represents a modulo operation, and assuming that $n_{RNTI} = 3324$, and I=32, accordingly, a number of the interleaver that should be used by the UE or the eNodeB is 3324 mod 32=28.

In this way, when processing data, the UE or the eNodeB needs to use an interleaver whose number is 28 for processing.

The preset association relationship between the interleaver identifier and the identifier of the UE and the total quantity of interleavers in the available interleaver set of the UE may also be expressed as follows:

$$i = ((A \cdot n_{RNTI}) \bmod D) \bmod I, \text{ where}$$

A and D are two different large prime numbers, for example, A=39827 and D=65537.

Optionally, based on the second optional embodiment corresponding to FIG. 1, in a fourth optional embodiment of the method for determining an interleaver provided in this embodiment of the present invention, the binding parameter further includes a total quantity of interleavers in an available interleaver set of the UE, and the determining the interleaver identifier according to the identifier of the UE, the time information for transmitting data, and a preset association relationship between the interleaver identifier and the identifier of the UE and the time information for transmitting data includes:

determining the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

In this embodiment of the present invention, the preset association relationship between the interleaver identifier and the identifier of the UE, the time information for transmitting data, and the total quantity of interleavers in the available interleaver set of the UE may be expressed as follows:

$$i = (n_{RNTI} + n_{subframe}) \bmod I, \text{ where}$$

i represents the interleaver identifier, $n_{RNTI}$ represents the cell radio network temporary identifier, $n_{subframe}$ represents a subframe number for transmitting data, and I represents the total quantity of interleavers in the available interleaver set of the UE.

In this embodiment of the present invention, the total quantity of interleavers may be a quantity of all interleavers in an IDMA system, may be a quantity of interleavers in an available interleaver set corresponding to the identifier of the UE after all interleavers are grouped into several sets, or may be a preset total quantity or an obtained total quantity that is related to a cell ID or a resource allocated by a UE.

"mod" represents a modulo operation, and assuming that $n_{RNTI}=3324$, $n_{subframe}=12$, and I=32, accordingly, a number of the interleaver that should be used by the UE or the eNodeB is (3324+12) mod 32=8.

In this way, when processing data, the UE or the eNodeB needs to use an interleaver whose number is 8 for processing.

The preset association relationship between the interleaver identifier and the identifier of the UE, the time information for transmitting data, and the total quantity of interleavers in the available interleaver set of the UE may also be expressed as follows:

$$i = Y_k \bmod I,$$

where $$Y_k = (A \cdot Y_{k-1}) \bmod D$$

Herein, A and D are two different large prime numbers, for example, A=39827 and D=65537, $Y_{k-1}=n_{RNTI}$ and k represents the subframe number.

Figure 2:
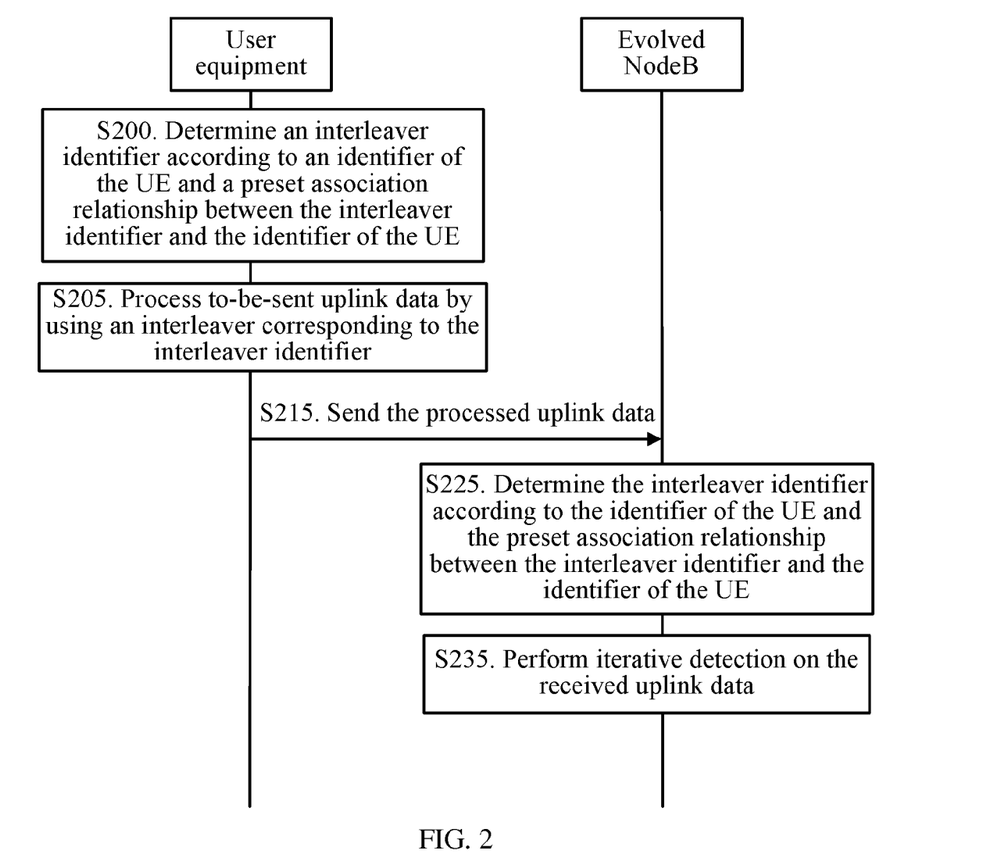
FIG. 2 is a schematic diagram of an embodiment of an application scenario according to the embodiments of the present invention.
Figure 3:
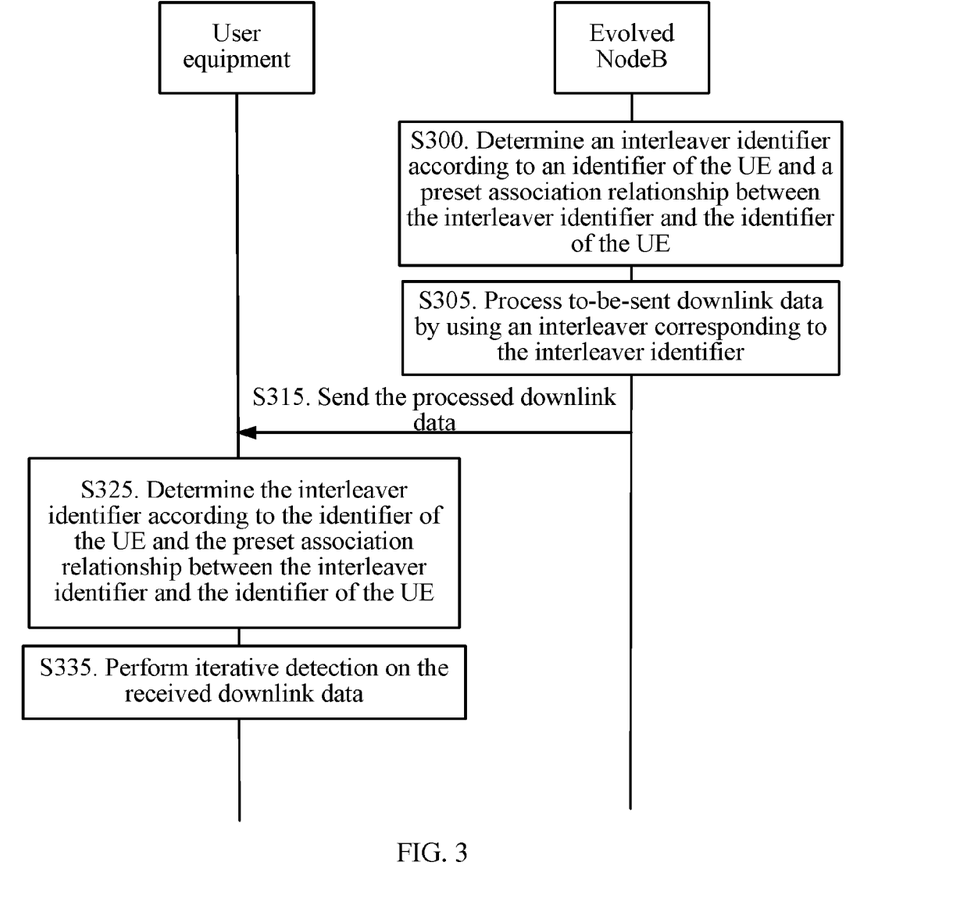
FIG. 3 is a schematic diagram of another embodiment of an application scenario according to the embodiments of the present invention.

To facilitate an understanding, two application scenarios are used as examples in the following to describe in detail how to determine an interleaver in a process in which a UE and/or an eNodeB performs uplink/downlink transmission.

Referring to FIG. 2, when needing to send uplink data, a user equipment UE executes the following steps:

S200: The user equipment determines an interleaver identifier according to an identifier of the UE and a preset association relationship between the interleaver identifier and the identifier of the UE.

It is assumed that the preset association relationship between the interleaver identifier and the identifier of the UE is as follows:

$$i = n_{RNTI} \bmod M, \text{ where}$$

when $n_{RNTI}=3324$ and M=32, it is obtained by means of calculation that the interleaver identifier i=28.

S205: The user equipment processes to-be-sent uplink data by using an interleaver corresponding to the interleaver identifier.

With reference to step 200, the UE processes the uplink data by using an interleaver whose number is 28.

S215: The user equipment sends the processed uplink data to an eNodeB.

S225: The evolved NodeB determines the interleaver identifier according to the identifier of the UE and the preset association relationship between the interleaver identifier and the identifier of the UE.

It is assumed that the preset association relationship between the interleaver identifier and the identifier of the UE is as follows:

$$i = n_{RNTI} \bmod M, \text{ where}$$

when $n_{RNTI}=3324$ and M=32, it is obtained by means of calculation that the interleaver identifier i=28.

S235: The evolved NodeB performs iterative detection on the received uplink data, to implement decoding of the received uplink data.

With reference to step S225, the iterative detection is performed on the received uplink data by using the interleaver whose number is 28, to implement decoding of the received uplink data.

Referring to FIG. 3, when sending downlink data, an evolved NodeB executes the following steps:

S300: The evolved NodeB determines an interleaver identifier according to an identifier of a UE and a preset association relationship between the interleaver identifier and the identifier of the UE.

It is assumed that the preset association relationship between the interleaver identifier and the identifier of the UE is as follows:

$$i = n_{RNTI} \bmod M, \text{ where}$$

when $n_{RNTI}=3324$ and M=32, it is obtained by means of calculation that the interleaver identifier i=28.

S305: The evolved NodeB processes to-be-sent downlink data by using an interleaver corresponding to the interleaver identifier.

With reference to step 300, the evolved NodeB processes the downlink data by using an interleaver whose number is 28.

S315: The evolved NodeB sends the processed downlink data to the UE.

S325: After receiving the downlink data, the user equipment determines the interleaver identifier according to the identifier of the UE and the preset association relationship between the interleaver identifier and the identifier of the UE.

It is assumed that the preset association relationship between the interleaver identifier and the identifier of the UE is as follows:

$$i = n_{RNTI} \bmod M, \text{ where}$$

when $n_{RNTI}=3324$ and M=32, it is obtained by means of calculation that the interleaver identifier i=28.

It should be noted that, when the eNodeB performs downlink transmission, because the UE needs to learn, when performing iterative detection, information about another UE that shares a time-frequency resource with the UE, for example, information such as an interleaver, a modulation and coding scheme of the another UE that shares the time-frequency resource with the UE, to enable the UE to complete the iterative detection, the eNB further needs to provide the UE with other information, which is not content to be protected by the present invention and is not limited herein.

S335: The user equipment performs iterative detection on the received downlink data, to implement decoding of the received downlink data.

With reference to step S325, the iterative detection is performed on the received downlink data by using the interleaver whose number is 28, to implement decoding of the received downlink data.

Figure 4:
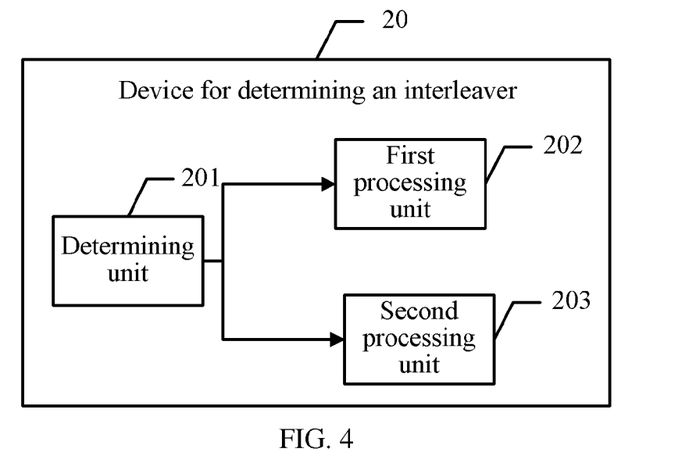
FIG. 4 is a schematic diagram of an embodiment of a device for determining an interleaver according to the embodiments of the present invention.

Referring to FIG. 4, an embodiment of a device for determining an interleaver according to the embodiments of the present invention includes:

a determining unit 201, configured to determine an interleaver identifier according to a binding parameter and a preset association relationship between the interleaver identifier and the binding parameter;

a first processing unit 202, configured to perform interleaving processing on to-be-sent data by using an interleaver corresponding to the interleaver identifier that is determined by the determining unit 201; and a second processing unit 203, configured to perform de-interleaving processing on received data by using the interleaver corresponding to the interleaver identifier that is determined by the determining unit 201.

According to this embodiment of the present invention, the determining unit 201 determines an interleaver identifier according to a binding parameter and a preset association relationship between the interleaver identifier and the binding parameter; the first processing unit 202 performs interleaving processing on to-be-sent data by using an interleaver corresponding to the interleaver identifier that is determined by the determining unit 201; and the second processing unit 203 performs de-interleaving processing on received data by using the interleaver corresponding to the interleaver identifier that is determined by the determining unit 201. According to the device for determining an interleaver provided in this embodiment of the present invention, a UE and an eNodeB both can accurately learn an interleaver that is used during data transmission by the other party, thereby de-interleaving data correctly.

Based on the embodiment corresponding to FIG. 4, in a first optional embodiment of the device for determining an interleaver provided in this embodiment of the present invention, the binding parameter includes an identifier of a user equipment UE; and the determining unit 201 is configured to determine the interleaver identifier according to the identifier of the UE and a preset association relationship between the interleaver identifier and the identifier of the UE.

Based on the first optional embodiment corresponding to FIG. 4, in a second optional embodiment of the device for determining an interleaver provided in this embodiment of the present invention, the binding parameter includes an identifier of a user equipment UE and time information for transmitting data; and the determining unit 201 is configured to determine the interleaver identifier according to the identifier of the UE, the time information for transmitting data, and a preset association relationship between the interleaver identifier and the identifier of the UE and the time information for transmitting data.

Based on the first optional embodiment corresponding to FIG. 4, in a third optional embodiment of the device for determining an interleaver provided in this embodiment of the present invention, the binding parameter further includes a total quantity of interleavers in an available interleaver set of the UE; and the determining unit 201 is configured to determine the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

Based on the second optional embodiment corresponding to FIG. 4, in a fourth optional embodiment of the device for determining an interleaver provided in this embodiment of the present invention, the binding parameter further includes a total quantity of interleavers in an available interleaver set of the UE; and the determining unit 201 is configured to determine the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

The present invention provides a computer storage medium, where the computer storage medium stores a program, where when the program is executed, some or all of the steps in the foregoing method for determining an interleaver are executed.

Figure 5:
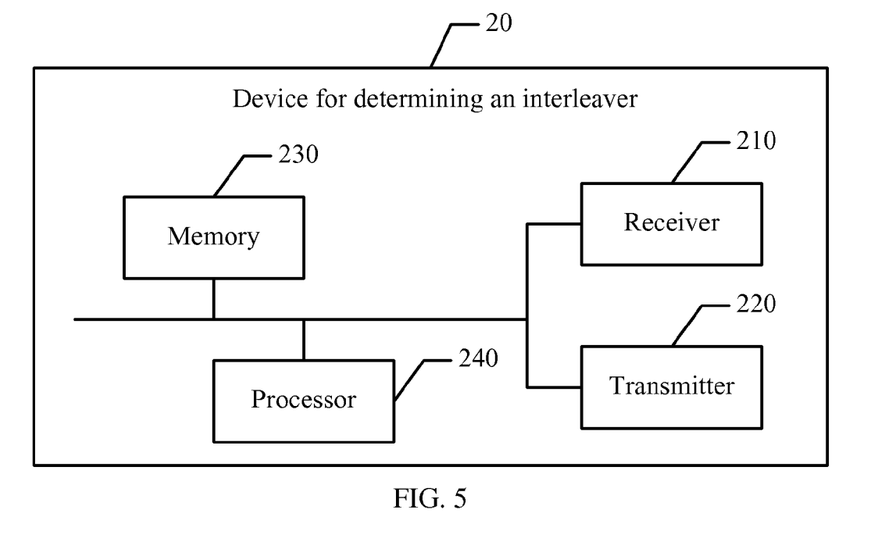
FIG. 5 is a schematic diagram of another embodiment of a device for determining an interleaver according to the embodiments of the present invention.

Referring to FIG. 5, another embodiment of a device for determining an interleaver according to the embodiments of the present invention includes: a receiver 210, a transmitter 220, a memory 230, and a processor 240.

The processor 240 executes the following steps:

determining an interleaver identifier according to a binding parameter and a preset association relationship between the interleaver identifier and the binding parameter;

performing interleaving processing on to-be-sent data by using an interleaver corresponding to the interleaver identifier; and performing de-interleaving processing on received data by using the interleaver corresponding to the interleaver identifier.

In some embodiments of the present invention, the binding parameter includes an identifier of a user equipment UE; and the processor 240 is configured to determine the interleaver identifier according to the identifier of the UE and a preset association relationship between the interleaver identifier and the identifier of the UE.

In some embodiments of the present invention, the binding parameter includes an identifier of a user equipment UE and time information for transmitting data; and the processor 240 is configured to determine the interleaver identifier according to the identifier of the UE, the time information for transmitting data, and a preset association relationship between the interleaver identifier and the identifier of the UE and the time information for transmitting data.

In some embodiments of the present invention, the binding parameter further includes a total quantity of interleavers in an available interleaver set of the UE; and the processor 240 is configured to determine the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

In some embodiments of the present invention, the binding parameter further includes a total quantity of interleavers in an available interleaver set of the UE; and the processor 240 is configured to determine the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

Figure 6:
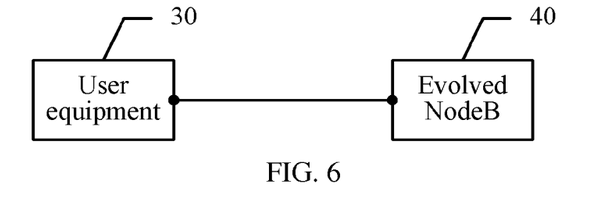
FIG. 6 is a schematic diagram of an embodiment of an IDMA communications system according to the embodiments of the present invention.

Referring to FIG. 6, an embodiment of an IDMA communications system according to the embodiments of the present invention includes: a user equipment 30 and an evolved NodeB 40.

The user equipment 30 is configured to determine an interleaver identifier according to a binding parameter and a preset association relationship between the interleaver identifier and the binding parameter; perform interleaving processing on to-be-sent uplink data or received downlink data by using an interleaver corresponding to the interleaver identifier; and send the processed to-be-sent uplink data.

The evolved NodeB 40 is configured to determine the interleaver identifier according to the binding parameter and the preset association relationship between the interleaver identifier and the binding parameter; perform interleaving processing on to-be-sent downlink data or received uplink data by using the interleaver corresponding to the interleaver identifier; and send the processed to-be-sent downlink data.

A person of ordinary skill in the art may understand that all or a part of the steps of the methods in the foregoing embodiments may be implemented by a program instructing relevant hardware. The program may be stored in a computer readable storage medium. The storage medium may include a ROM, a RAM, a magnetic disk, or an optical disc.

The method and device for determining an interleaver provided in the embodiments of the present invention are described in detail in the foregoing. In this specification, specific examples are used to describe the principle and implementation manners of the present invention, and the foregoing descriptions of the embodiments are only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for determining an interleaver, comprising:
by a user equipment (UE) and a base station:
determining an interleaver identifier according to a binding parameter and a preset association relationship between the interleaver identifier and the binding parameter, the binding parameter comprising an identifier of the UE, and the preset association relationship between the interleaver identifier and the binding parameter comprising a preset association relationship between the interleaver identifier and the identifier of the UE used to determine the interleaver identifier;
performing interleaving processing on to-be-sent data by using an interleaver corresponding to the interleaver identifier; and
performing de-interleaving processing on received data by using the interleaver corresponding to the interleaver identifier.

2. The method according to claim 1, wherein the binding parameter comprises an identifier of the UE and time information for transmitting data, and the determining an interleaver identifier according to a binding parameter and a preset association relationship between the interleaver identifier and the binding parameter comprises:
determining the interleaver identifier according to the identifier of the UE, the time information for transmitting data, and a preset association relationship between the interleaver identifier and the identifier of the UE and the time information for transmitting data.

3. The method according to claim 1, wherein the identifier of the UE is a cell radio network temporary identifier (C-RNTI) of the UE.

4. The method according to claim 1, wherein the binding parameter further comprises a total quantity of interleavers in an available interleaver set of the UE, and the determining the interleaver identifier according to the identifier of the UE and a preset association relationship between the interleaver identifier and the identifier of the UE comprises:
determining the interleaver identifier according to the identifier of the UE, the total quantity of interleavers in the available interleaver set of the UE, and a preset association relationship between the interleaver identifier and the identifier of the UE and the total quantity of interleavers in the available interleaver set of the UE.

5. The method according to claim 2, wherein the binding parameter further comprises a total quantity of interleavers in an available interleaver set of the UE, and the determining the interleaver identifier according to the identifier of the UE, the time information for transmitting data, and a preset association relationship between the interleaver identifier and the identifier of the UE and the time information for transmitting data comprises:
determining the interleaver identifier according to the identifier of the UE, the time information for transmitting data, the total quantity of interleavers in the available interleaver set of the UE, and a preset association relationship between the interleaver identifier and the identifier of the UE, the time information for transmitting data, and the total quantity of interleavers in the available interleaver set of the UE.

6. A non-transitory computer readable storage medium, wherein
the non-transitory computer readable storage medium stores a program, wherein when the program is executed, the method according to claim 1 is executed.

* * * * *